(12) United States Patent
Nagakura et al.

(10) Patent No.: US 7,752,912 B2
(45) Date of Patent: Jul. 13, 2010

(54) SLIDING FLUID LEVEL-DETECTING DEVICE

(75) Inventors: Syunsuke Nagakura, Makinohara (JP); Hisafumi Maruo, Shizuoka (JP); Takahiro Miyakawa, Makinohara (JP)

(73) Assignee: Yazaki Corporation, Tokyo (JP)

( * ) Notice: Subject to any disclaimer, the term of this patent is extended or adjusted under 35 U.S.C. 154(b) by 298 days.

(21) Appl. No.: 11/653,397

(22) Filed: Jan. 16, 2007

(65) Prior Publication Data

US 2007/0163341 A1     Jul. 19, 2007

(30) Foreign Application Priority Data

Jan. 16, 2006    (JP) ............................. 2006-007806

(51) Int. Cl.
*G01F 23/32* (2006.01)
(52) U.S. Cl. ...................................... 73/317
(58) Field of Classification Search .................. 73/317, 73/313; 340/625, 623
See application file for complete search history.

(56) References Cited

U.S. PATENT DOCUMENTS 4,394,171 A * 7/1983 Nair ........................... 106/1.14
6,571,627 B2 * 6/2003 Yasuda et al. ................. 73/317

FOREIGN PATENT DOCUMENTS

| JP | 2002-202179 A | 7/2002 |
| JP | 2003-287455 A | 10/2003 |
| JP | 2003-287456 A | 10/2003 |

OTHER PUBLICATIONS

EPA Staff Paper on Gasoline Sulfur Issues. May 1, 1998. EPA420-R-98-005.*

* cited by examiner

*Primary Examiner*—Hezron Williams
*Assistant Examiner*—Nathaniel Kolb
(74) *Attorney, Agent, or Firm*—Sughrue Mion, PLLC

(57) ABSTRACT

A sliding fluid level-detecting device which is mounted in a fuel tank of a vehicle and detects a remaining amount of a liquid fuel in the tank by sliding, on a plurality of stripes of an electrode formed at an electrode part electrically connecting with a fuel meter, a contact point provided on a slider interlocking with displacement of a float floating on a fluid surface of the liquid fuel, wherein the electrode is formed out of a glass-incorporated silver-palladium alloy where glass is mixed in an amount of 30 to 50 parts by weight per 100 parts by weight of a silver-palladium alloy and the contact point is formed out of a conductive material having a Vickers hardness (Hv) of 190 to 250.

4 Claims, 3 Drawing Sheets

Ag/ Pd/GLASS=70/30/18

Ag/ Pd/GLASS=70/30/31

Ag/ Pd/GLASS=60/40/43

SLIDING FLUID LEVEL-DETECTING DEVICE

BACKGROUND OF THE INVENTION

1. Field of the Invention

The present invention relates to a sliding fluid level-detecting device which detects a remaining amount of a liquid fuel such as gasoline or gas oil placed in fuel tanks of various vehicles such as automobiles, motorcycles, buses, and trucks.

2. Related Art

A vehicle is equipped with a fuel gauge which informs its driver of a remaining amount of a liquid fuel in a fuel tank. The fuel gauge is mounted in the fuel tank and connected with a fluid level-detecting device which detects a fluid level of the liquid fuel, and a sliding fluid level-detecting device using a system of detecting displacement of a float floating on a liquid fuel has been widely used.

FIG. 1 is a schematic diagram illustrating one example of the sliding fluid level-detecting device. As shown in the figure, the sliding fluid level-detecting device is supported by a supporting board 2 on an inner wall 1a in the vicinity of opening of a fuel tank 1. The supporting board 2 is equipped with an insulation board 3 and, as shown in FIG. 2 in a magnified form, a plurality of electrodes 4, 4 are placed in an arc-shaped form. Furthermore, an arc-shaped resistive layer 5 extending in a band form is formed so as to cover the outer edge of the electrodes 4, 4 and thereby an electrode part 10 is constituted. Moreover, a terminal 7 provided at the end of a slider 6 comes into contact with the electrodes 4, 4.

In addition, the sliding fluid level-detecting device is equipped with a rod-like electrically insulating arm 8 and a float 9. The arm 8 is connected with a rotating base 6a of the slider 6 at the one end 8 and the arm 8 is capable of integrally rotating together with the slider 6, the rotating base 6a being a center. Moreover, the float 9 is connected with another end 8b of the arm and the float 9 floats on the liquid surface of a liquid fuel in the fuel tank 1 and is displaced in a vertical direction in the figure corresponding to the displacement of the fluid level.

In the sliding fluid level-detecting device constituted as mentioned above, when the float 9 is displaced corresponding to the fluid level of the liquid fuel, the arm 8 rotates, the rotating base 6a being a center. Following the movement, the slider 6 connected with the arm 8 also rotates, the rotating base 6a being a center. Following the rotation of the slider 6, a contact point 7 slides on the surface of the electrodes 4, 4 and, at that time, the remaining amount of the liquid fuel is detected based on the resistance value between the terminal 7 and an endmost part 5b of the resistive layer 5.

In such a sliding fluid level-detecting device, as a material for forming the contact point 7 and the electrode 4, a silver-palladium alloy or a silver-nickel alloy has been hitherto employed. However, since the electrode part 10 has been immersed in the liquid fuel in the fuel tank 1, there has arisen a problem that sulfur matter contained in the liquid fuel reacts with the silver-palladium alloy or silver-nickel alloy to form silver sulfide, an insulating material, on the surface of the contact point 7 and electrode 4, the formation invites an insufficient contact between the contact point 7 and the electrode 4, and thereby a detection accuracy decreases with time.

Thus, in order to prevent the formation of silver sulfide, it has been proposed to form the contact point 7 and the electrode 4 out of a glass-incorporated silver-palladium alloy where glass is mixed with a silver alloy such as a silver-palladium alloy or a silver-nickel alloy (see, e.g., Patent Documents JP-A-2002-202179, JP-A-2003-287455 and JP-A-2003-287456).

In conventional glass-incorporated silver alloys, the admixed amount of glass is in the range of 10 to 15 parts by weight per 100 parts by weight of a silver alloy and it is observed that the glass-incorporated silver alloys are effective for highly purified gasoline and gas oil having a sulfur concentration of 10 to several dozen ppm. However, gasoline and gas oil having a sulfur concentration of near to 100 ppm have been used particularly abroad and thus there is a possibility that a sulfuration-preventing effect becomes insufficient in the case of conventional glass-incorporated silver alloys.

SUMMARY OF THE INVENTION

Thus, an object of the invention is to enhance the sulfuration-preventing effect on electrodes and a contact point to a large degree than before and to impart durability against gasoline and gas oil having a sulfur concentration of near to 100 ppm, in a sliding fluid level-detecting device of a vehicle.

In order to achieve the above object, the invention provides the following sliding fluid level-detecting device.

(1) A sliding fluid level-detecting device which is mounted in a fuel tank of a vehicle and detects a remaining amount of a liquid fuel in the tank by sliding, on a plurality of stripes of an electrode formed at an electrode part electrically connecting with a fuel meter, a contact point provided on a slider interlocking with displacement of a float floating on a fluid surface of the liquid fuel, wherein the electrode is formed out of a glass-incorporated silver-palladium alloy where glass is mixed in an amount of 30 to 50 parts by weight per 100 parts by weight of a silver-palladium alloy and the contact point is formed out of a conductive material having a Vickers hardness (Hv) of 190 to 250.

(2) The sliding fluid level-detecting device according to the above (1), wherein the ratio of (silver/palladium) in the silver-palladium alloy is from 70/30 to 60/40 as a weight ratio.

(3) The sliding fluid level-detecting device according to the above (1) or (2), wherein the contact point is formed out of a copper-nickel alloy of (copper 70/nickel 30) as a weight ratio.

(4) The sliding fluid level-detecting device according to any one of the above (1) to (3), which is used for a liquid fuel having a sulfur concentration of 100 ppm or less.

Since an electrode is formed out of a glass-incorporated silver-palladium alloy wherein the admixed amount of glass is increased to a large degree than before in the sliding fluid level-detecting device of the invention, the formation of silver sulfide which may be a cause of bad electrical contact can be prevented over a long period of time even when a liquid fuel contains sulfur in a high concentration of near to 100 ppm. On the other hand, since hardness of the electrode increases with the increase of the admixed amount of glass, use of a contact point having a Vickers hardness (Hv) of 190 to 250 suppresses abrasion thereof owing to sliding contact with the electrode as far as possible. By combining such an electrode with such a contact point, the sliding fluid level-detecting device becomes extremely excellent in durability and exhibits a high reliability, so that it is satisfactorily applicable to vehicles using a liquid fuel containing sulfur in a high concentration of near to 100 ppm.

DETAILED DESCRIPTION OF THE PREFERRED EMBODIMENTS

The following will describe the invention in detail.

Figure 1:
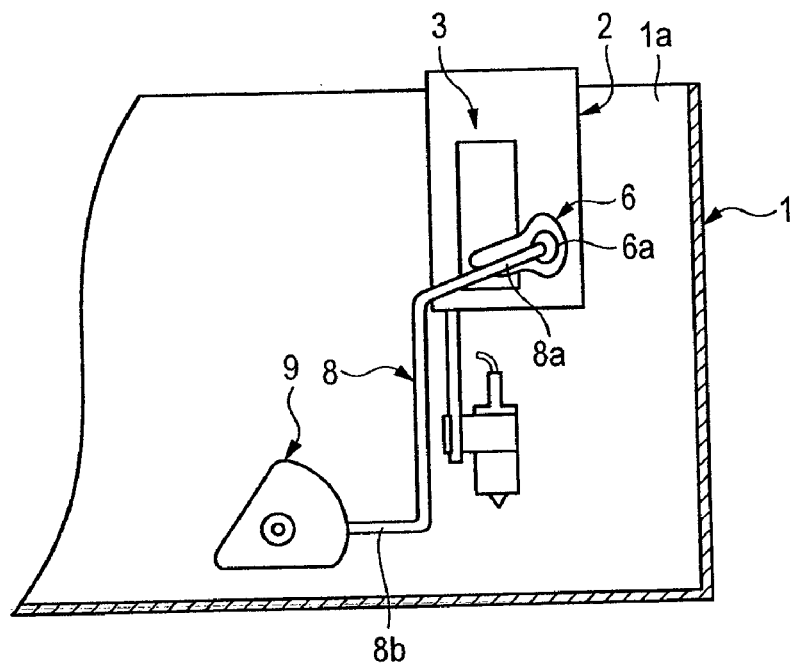
FIG. 1 shows a situation where a sliding fluid level-detecting device is mounted in a fuel tank.
Figure 2:
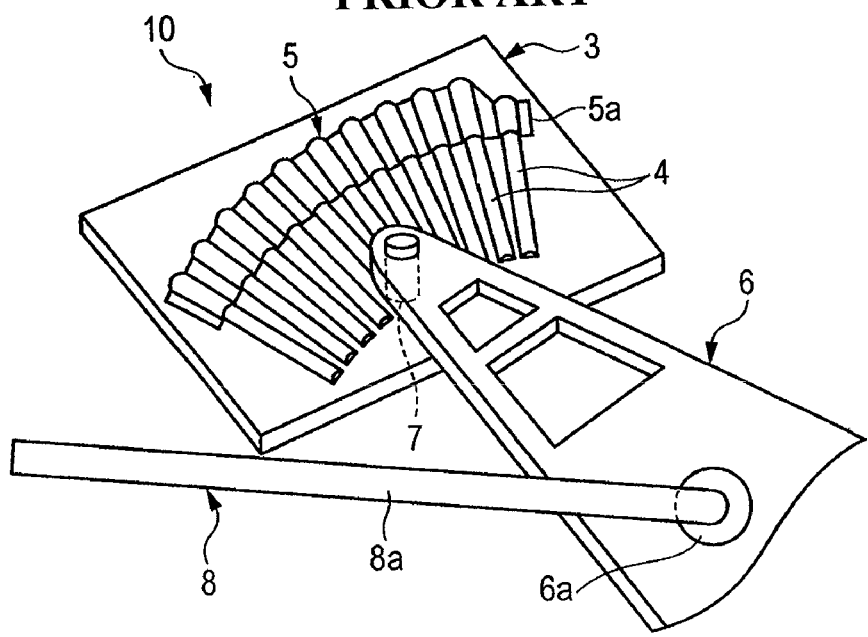
FIG. 2 shows an enlarged view in the vicinity of the electrode and contact point of an electrode part.

In the invention, the structure and constitution of the sliding fluid level-detecting device itself are not limited and, for example, a sliding fluid level-detecting device shown in FIG. 1 and FIG. 2 can be exemplified. In the invention, the electrode 4 is formed out of a specific glass-incorporated silver-palladium alloy to be mentioned below and also the contact point 7 is formed out of a specific conductive material to be mentioned below.

The electrode 4 is formed out of a glass-incorporated silver-palladium alloy where glass is mixed in an amount of 30 to 50 parts by weight. As mentioned above, an electrode is formed out of a glass-incorporated silver alloy but the admixed amount of glass is in an amount of 10 to 15 parts by weight, so that an effect of preventing the formation of silver sulfide against gasoline and gas oil having a high sulfur concentration of near to 100 ppm is insufficient and the effect decreases for a short period of time, which results in the formation of silver sulfide. Accordingly, in the invention, the admixed amount of glass is increased to from 30 to 50 parts by weight and thereby the reaction with sulfur is suppressed over a long period of time. However, when the admixed amount of glass exceeds 50 parts by weight, conductivity of the electrode 4 cannot be ensured. When it is considered to maintain the effect of preventing the formation of silver sulfide for a long period of time and to ensure the conductivity, the admixed amount of glass is preferably from 30 to 45 parts by weight.

In this connection, the kind and composition of glass are not limited and soda glass and borosilica glass are suitable since they are inexpensive and easily available.

With regard to the silver-palladium alloy, the ratio of (silver/palladium) is preferably from 70/30 to 60/40 as a weight ratio. Palladium is a metal excellent in corrosion resistance and abrasion resistance and a sufficient durability can be imparted by controlling the content to 30% by weight or more based on the total amount of the alloy. On the other hand, since palladium is expensive, the content is preferably 40% by weight or less in view of the cost.

Moreover, an alloy component such as gold, cobalt, or nickel can be added to the above glass-incorporated silver-palladium alloy, if necessary. In particular, gold has an effect of improving conductivity and suppressing the reaction with sulfur. Furthermore, cobalt has an effect of improving the abrasion resistance of the electrode. The amounts of these alloy components to be added are suitably selected according to the purpose and composition of the silver-palladium alloy.

For the formation of the electrode 4, silver, palladium, and glass are dispersed into an appropriate solvent, e.g., terpineol or butyldiglycol acetate in a predetermined ratio, further gold, cobalt, nickel, or the like is added thereto according to need to prepare a paste, and the paste is coated on the surface of the insulation board 3, followed by drying and baking. As shown in FIG. 2, the electrode 4 is formed as a plurality of strips and the number thereof is suitably determined according to the volume of the fuel tank 1. Moreover, the durability increases with the increase of the film thickness of the electrode 4, but unnecessarily thick one only results in cost increase and hence the thickness is suitably 15 μm or less in view of both of the durability and the cost.

Since the electrode 4 has an admixed amount of glass twice the amount of the conventional one, the hardness is also considerably enhanced. Therefore, it is necessary to enhance the abrasion resistance of the contact point 7 come into sliding contact with the electrode 4 by controlling the Vickers hardness of the contact point 7 to from 190 to 250. Moreover, since the contact point 7 also comes into contact with the liquid fuel, it is necessary to have sulfuration resistance. When these requirements are considered, a copper-nickel alloy is preferred as a material for the contact point and particularly, a copper nickel alloy having a weight ratio of (copper 70:nickel 30) is preferred. Moreover, since Vickers hardness (Hv) varies depending on processing conditions even when the alloy composition is the same, the processing conditions are adjusted so as to achieve the aimed Vickers hardness.

Moreover, elasticity is preferably imparted to the contact point 7 in order to achieve secure contact and smooth sliding thereof with the electrode 4. Furthermore, the cross-section of the contact point 7 is preferably a semicircular form, a semielliptic form, or the like in order to suppress the abrasion of the contact point itself and the electrode 4 owing to sliding. Specific structures of the slider 6 and the contact point 7 may be the structures described in JP-A-2003-4506 but are not limited thereto.

EXAMPLES

The following will further describe the invention with reference to Test Examples but the invention is by no means limited thereby.

(Test-1)

A paste was prepared by adding 70 parts by weight of silver, 30 parts by weight of palladium, and 18 parts by weight of soda glass to terpineol. Then, as shown in FIG. 2, the paste was coated on an insulation board by screen printing, dried, and baked to arrange 60 pieces of a linear electrode having a width of 0.2 mm and a length of 5 mm at 0.2 mm intervals in an arc-shaped form and further, a ruthenium oxide-based resistive paste was formed on the electrodes in a band shape to form a resistive layer 5, whereby an electrode part was manufactured. Namely, the composition of the electrode is a glass-incorporated silver-palladium alloy where 18 parts by weight of soda glass is mixed per 100 parts by weight of a silver-palladium alloy of (silver 70/palladium 30) as a weight ratio.

Moreover, there was prepared a paste where the amounts of silver and palladium were the same as above and the admixed amount of soda glass was changed to 25 parts by weight, 31 parts by weight, 37 parts by weight, or 43 parts by weight. Then, electrode parts as above were manufactured.

On the other hand, sliders were prepared, wherein various contact points formed out of a copper-nickel alloy of (coppet 70:nickel 30) as a weight ratio, showing a semicircular shape having a radium of 3 mm, and having different Vickers hardness in the range of 190 to 250 were provided. Then, each of the sliders and the above each electrode part were installed into a sliding fluid level-detecting device (manufactured by Yazaki Corporation) to form a sample.

The sample was mounted on a 20 L fuel tank. Gasoline prepared so as to be a sulfur concentration of 100 ppm was injected into the fuel tank until the tank was filled up. After the contact point and the electrode were brought into sliding contact with each other one million times by changing the fluid level of the gasoline by means of a pump, the tank was again filled up and then the gasoline was sucked by the pump to lower the fluid level continuously, change in voltage at that time being measured.

Figure 3:
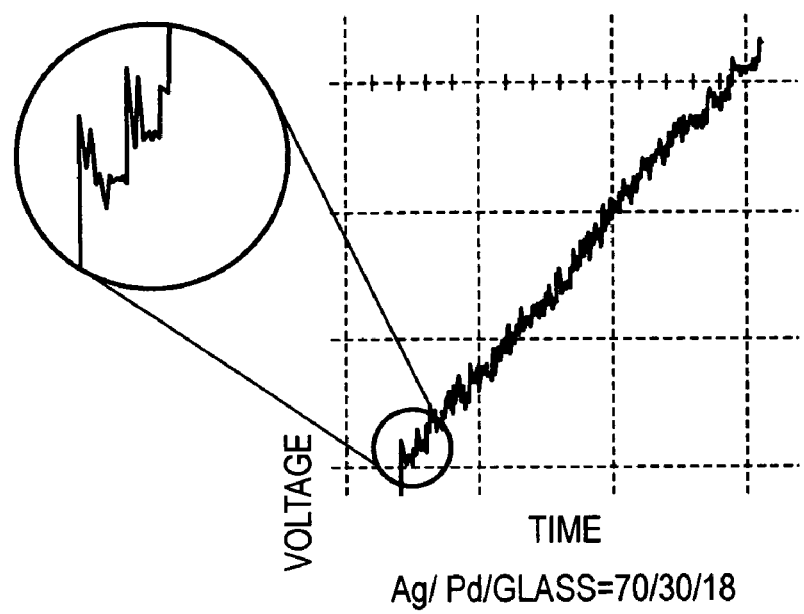
FIG. 3 shows a chart where a remaining amount of gasoline is measured using an electrode of (silver/palladium/glass=70/30/18) in Test-1.
Figure 4:
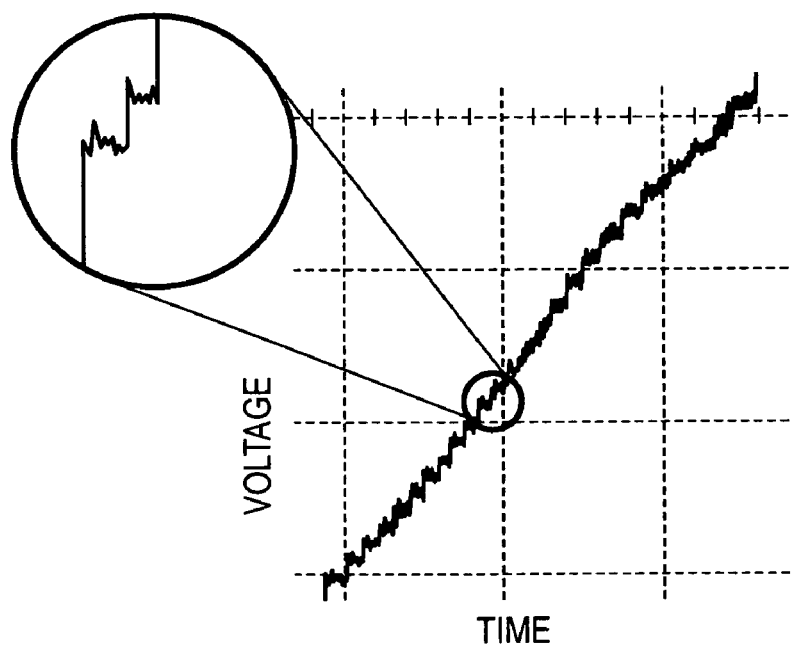
FIG. 4 shows a chart where a remaining amount of gasoline is measured using an electrode of (silver/palladium/glass=70/30/31) in Test-1.

FIG. 3 is a measured chart when an electrode having an admixed amount of glass of 18 parts by weight is used, wherein the voltage varies stepwise but a salient peak exceeding its upper stand to a large extent is jutted out from its lower stand between every neighboring lower stand and upper stand, so that the electrode is unsuitable for liquid fuel having a high sulfur concentration of near to 100 ppm. Moreover, though the figure is omitted, also in the case of using an electrode having an admixed amount of glass of 27 parts by weight, a salient peak exceeding its upper stand to a large extent was jutted out from its lower stand. On the other hand, FIG. 4 is a measured chart when an electrode having a glass-incorporated amount of 31 parts by weight is used, wherein any salient peak exceeding its upper stand to a large extent does not jutted out from its lower stand, so that it is realized that the electrode is practically satisfactorily durable for liquid fuel having a high sulfur concentration of near to 100 ppm. In this connection, difference in chart pattern (wave pattern) owing to the difference in Vickers hardness (Hv) of the contact point was substantially not observed. Moreover, though the figure is omitted, also in the case of using an electrode having an admixed amount of glass of 37 parts by weight or 43 parts by weight, any salient peak exceeding its upper stand to a large extent was not jutted out from its lower stand.

(Test-2)

Figure 5:
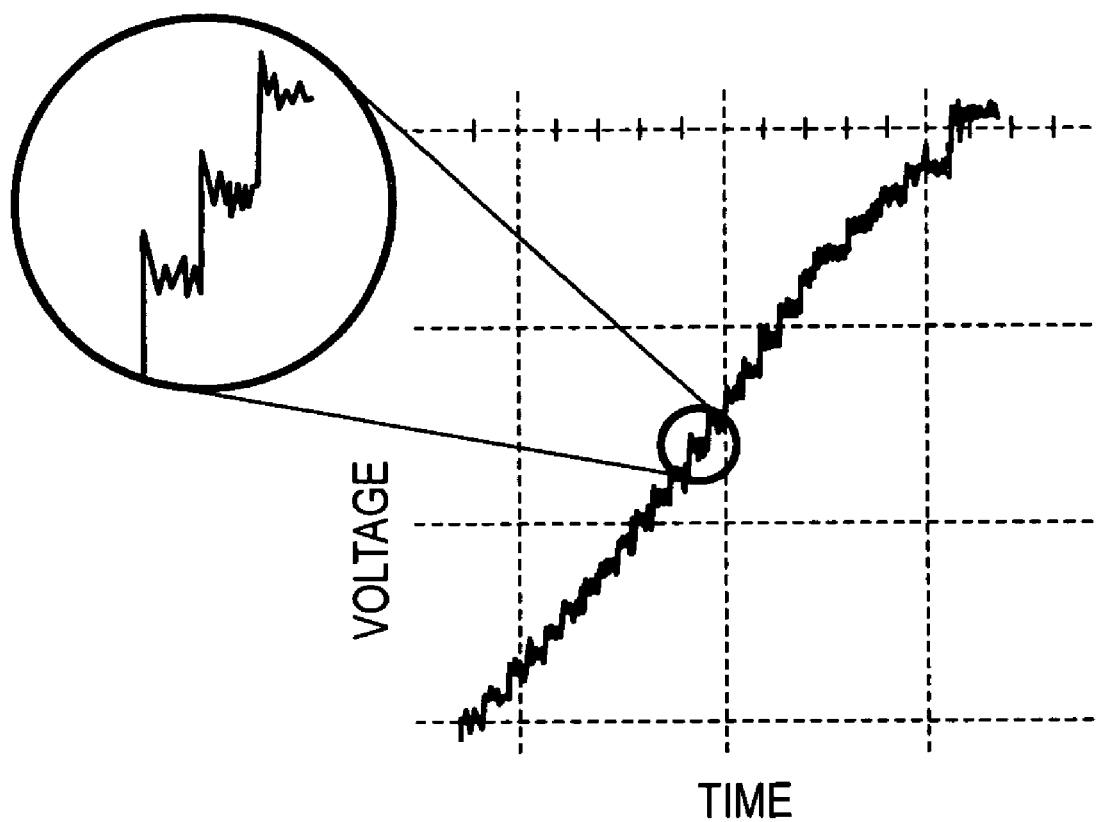
FIG. 5 shows a chart where a remaining amount of gasoline is measured using an electrode of (silver/palladium/glass=60/40/43) in Test-2.

An electrode part was manufactured in the same manner as in Test-1 except that the ratio of (silver/palladium) was change to 60/40 and then the same test was conducted using the same contact points as in Test-1. As a result, when an electrode having an admixed amount of glass of 18 parts by weight or 25 parts by weight was used, a salient peak exceeding its upper stand to a large extent was jutted out from its lower stand as in Test-1. On the other hand, when an electrode having an admixed amount of glass of 31 parts by weight or 37 parts by weight was used, as in Test-1, any salient peak exceeding its upper stand to a large extent does not jutted out from its lower stand, so that it is realized that the electrode is practically satisfactorily durable for liquid fuel having a high sulfur concentration of near to 100 ppm. FIG. 5 shows a measured chart when an electrode having a glass-incorporated amount of 43 parts by weight was used.

Table 1 summarizes the results of the above Test-1 and Test-2.

TABLE 1

Table 1: Evaluation Results of Practicability Against Gasoline Having Sulfur Concentration of 100 ppm

| Electrode Composition (Ag/Pd/Glass/parts by weight) | Evaluation |
| --- | --- |
| 70/30/18 | unsuitable |
| 70/30/25 | unsuitable |
| 70/30/31 | practicable |
| 70/30/37 | practicable |
| 70/30/43 | practicable |
| 60/40/18 | unsuitable |
| 60/40/25 | unsuitable |
| 60/40/31 | practicable |
| 60/40/37 | practicable |
| 60/40/43 | practicable |

What is claimed is:

1. A sliding fluid level-detecting device which is mounted in a fuel tank of a vehicle and detects a remaining amount of a liquid fuel in the tank comprising:

a plurality of electrodes which are formed in strips and formed on an electrode part which is electrically connected with a fuel meter, a contact point which slides on the plurality of electrodes and is provided on a slider which moves integrally with a displacement of a float which is floating on a fluid surface of the liquid fuel, wherein the electrode is formed out of a glass-incorporated silver-palladium alloy which comprises 30 to 50 parts by weight of glass per every 100 parts by weight of a silver-palladium alloy, and wherein the contact point is formed out of a conductive material having a Vickers hardness (Hv) of 190 to 250.

2. The sliding fluid level-detecting device according to claim 1, wherein the weight ratio of silver to palladium in the silver-palladium alloy is from 70/30 to 60/40.

3. The sliding fluid level-detecting device according to claim 1, wherein the contact point is formed out of a copper-nickel alloy which has a weight ratio of 70 parts of copper per every 30 parts of nickel.

4. The sliding fluid level-detecting device according to claim 1, which is used for a liquid fuel having a sulfur concentration of 100 ppm or less.

* * * * *